United States Patent [19]

Leigh

[11] 4,108,960

[45] Aug. 22, 1978

[54] COMPOSITIONS CONTAINING DITHIONITES

[75] Inventor: Roland Albert Leigh, Port Elizabeth, South Africa

[73] Assignee: BOC Limited, London, England

[21] Appl. No.: 718,613

[22] Filed: Aug. 30, 1976

[51] Int. Cl.$^2$ ............................................. C01B 17/66
[52] U.S. Cl. .................................... 423/265; 423/515; 252/188; 423/268
[58] Field of Search ...................... 423/265, 268, 515; 252/188

[56] References Cited

U.S. PATENT DOCUMENTS

| 3,433,590 | 3/1969 | Weele et al. ...................... 423/515 X |
| 3,468,623 | 9/1969 | Weele et al. .......................... 423/515 |
| 3,819,807 | 6/1974 | Schreiner et al. ................ 423/515 X |
| 3,856,696 | 12/1974 | Stanbank et al. .................... 252/188 |
| 3,923,960 | 12/1975 | Leigh ................................ 423/515 X |

*Primary Examiner*—Jack Cooper
*Attorney, Agent, or Firm*—Dennison, Dennison, Meserole & Pollack

[57] ABSTRACT

Anhydrous metal dithionite compositions are stabilized by 0.1 to 5% by weight of the composition of one or more of vanillin, ethyl vanillin and benzoin.

2 Claims, No Drawings

COMPOSITIONS CONTAINING DITHIONITES

This invention relates to compositions comprising a metallic dithionite, particularly sodium dithionite.

Aqueous solutions of dithionite are used extensively in the textile and pulp paper industries as bleaching agents, as reducing agents for vat dyes and as means of destroying dyes containing azo links. The dithionite is normally stored as a solid until required. Commercially available powdered anhydrous sodium dithionite is stable for long periods in dry air but undergoes decomposition in the presence of water or water vapor. The action of water is initially to form the dihydrate of the dithionite with the liberation of heat. The dihydrate is particularly readily oxidized by atmospheric oxygen, again exothermically. If the heat liberated in these two reactions is not removed rapidly enough a third exothermic reaction may occur, namely, the spontaneous decomposition of the salt with the dis-engagement of sulphur dioxide and the formation of thiosulphate, bisulphite and sulphur. The heat liberated during these reactions may be so great that the temperature of the decomposing compositions rises above the ignition point of sulphur, so that the composition finally begins to burn. Since dithionites are often used in environments of high humidity this tendency to ignite is a serious problem which has in fact given rise to a number of fires in dye-houses and pulp-mills.

It is known to reduce the ignitability of dithionites by admixture of additives. A wide diversity of such stabilising additives is known although the extent of the stabilizing effect may vary considerably and no theory has yet been advanced to satisfactorily explain either the nature or the variation in degree of the stabilising effect. Therefore no prediction of stabilising ability is generally possible.

This may be seen from the varied nature of the previously suggested additives. Thus, U.S. Pat. No. 1 810 664 suggests the use of a saponifiable coating agent together with alkali which removes the coating by hydrolysis on addition to water; possible coating agents include metal soaps, sulphonated soaps and sulphonated fatty acids. U.S. Pat. No. 3 054 658 recommends sodium or potassium salts of $C_1$ to $C_{10}$ alkanoic acids or sodium or potassium benzoates. U.S. Pat. No. 3 468 623 states that suberic, azelaic or sebacic acids or salts thereof may be used. It is therefore clear that ability to stabilize dithionites is highly specific to individual compounds or small classes of compounds and that even closely similar compounds or homologues may differ markedly in their effectiveness.

We have now discovered that certain aromatic materials containing a carbonyl group are capable of stabilizing dithionites in small quantities under extreme conditions. The present invention thus provides a substantially anhydrous composition comprising a major proportion of a metallic dithionite and, as a stabilizer therefor, vanillin, ethyl vanillin or benzoin.

For ease of reference, vanillin, ethylvanillin and benzoin are described collectively herein as aromatic carbonyl compounds.

Accordingly the present invention provides a composition containing an anhydrous metallic dithionite and an aromatic carbonyl compound (as hereinbefore defined) as a stabilizer therefor, wherein the metallic dithionite represents a major proportion of the composition and the aromatic carbonyl compound is one or more of vanillin, ethyl vanillin or benzoin.

Compositions of the invention have substantial stability to decomposition in the presence of humid air even at concentrations of aromatic carbonyl compound down to as little as 0.1% by weight on the compositions.

The quantity of aromatic carbonyl compound employed in the novel compositions will depend upon its effectiveness and upon the intended lifetime and storage conditions of the composition. In some cases a stabilized composition might contain, say, as little as 0.05% by weight while in other cases it might be found desirable to employ up to 2% or, in extreme cases, 5% on the same basis; concentrations of from 0.2 to 2.0% are suitable in the main.

The aromatic carbonyl compounds may be easily mixed with a dithionite by known methods, mixing being as intimate as possible. If desired they may be dissolved in an organic solvent, e.g. isopropanol which may subsequently be evaporated or distilled off. Alternatively they may be mixed into the dithionite as a melt. They may also be incorporated into the dithionite during the last stages of dithionite manufacture instead of into the already manufactured dithionite. For example, an alcohol-wet filter cake of a dithionite may be mixed with an alcoholic solution of one of the compounds before dring in a rotary vacuum dryer. Alternatively the compounds may be dissolved or dispersed in a solution or slurry of a dithionite prior to evaporation to dryness in suitable equipment. If desired a known free flowing agent such as a sodium phosphate or a sodium salt of a condensed phosphoric acid, soda ash, sodium bicarbonate, sodium benzoate, EDTA or, urea may be added. However, the presence of a free flowing agent will not normally be necessary.

The invention is particularly applicable in the stabilization of sodium dithionite, but other metal dithionites, such as the potassium or calcium dithionites may be stabilized similarly. The invention is also applicable in the stabilisation of dithionite products of low strength for example sodium dithionite products containing from 50% to 90% of $Na_2S_2O_4$.

The novel compositions may be used in general in any application in which dithionites are at present used, e.g. in vat dyeing and printing, in the stripping of dyes from textiles, the reduction clearing of dyed fibers and in the bleaching of textile materials and paper pulp. The novel compositions are of particular utility because the low concentration of water soluble stabilizer generally presents no problems in the processing operation. The novel compositions including vanillin are also suitable for use in food applications wherein dithionites are already used.

Vanillin is readily obtainable commercially as a natural extract, a synthetic chemical or as a by-product of wood-pulp admixed with some lignin. A material of the last type is sold under the trade name "Bavorin". Ethyl vanillin is also commercially available, e.g. under the trade name "Ethavan".

The invention is illustrated by the following examples. In the examples the effectiveness of various stabilizers was tested by the following method: 100g. of an intimate blend of sodium dithionite and stabilizer in known proportions is placed in a 250 ml. Dewar flask and 7 ml. of distilled water added in one minute by means of a metering pump, the mixture being stirred continuously during this addition. Six thermocouples are then introduced into the Dewar to enable temperature changes in various parts of the mixture to be observed, all six thermocouples being connected to a six-point recording potentiometer. After 3 minutes a further 100g. of the dithionite mixture is added to the flask and recording of the temperature of the mixture continued until it returns to ambient temperature. Mixtures were adjudged to be satisfactorily stabilized when the recorded temperature initially rose to 120°-140° C then gradually fell to the ambient value. By comparison, mixtures incorporating non-stabilizing or unsatisfactorily stabilizing materials show a further exotherm beyond 130°-140° C to above 200° C and in some cases burn.

Details of examples using the test method described are given in Table 1. In all cases the test mixtures were made by simply mixing the solids together as intimately as possible.

| Stabilizer | % Stabilizer in Mixture (w/w) | Maximum Temperature Observed (° C) | Time taken to reach maximum temperature (mins) |
|---|---|---|---|
| None present | 0 | 320 | 50 |
| Vanillin | 2 | 131 | 37 |
| Vanillin | 1 | 133 | 43 |
| Vanillin | 0.5 | 125 | 40 |
| Vanillin | 0.25 | 132 | 38 |
| Vanillin | 0.125 | 131 | 38 |
| Benzoin | 2 | 130 | — |

The stabilizers of the invention can be seen from these results to give a very marked stabilizing effect and to compare favourably with stabilizers hitherto proposed.

I claim:

1. An essentially anhydrous composition containing metal dithionite and at least one aromatic carbonyl compound selected from the group consisting of vanillin, ethyl vanillin and benzoin as a stabilizer therefor, wherein the metal dithionite constitutes at least 50% by weight of the composition and the aromatic carbonyl compound constitutes from 0.1% to 5% by weight of the composition.

2. A composition according to claim 1, wherein the quantity of aromatic carbonyl compound is within the range 0.2 to 2.0% by weight of the composition.

* * * * *